United States Patent [19]

Thornton

[11] Patent Number: 5,229,712
[45] Date of Patent: Jul. 20, 1993

[54] CIRCUIT AND METHOD FOR PRODUCING A FLEXIBLE REFERENCE VOLTAGE

[76] Inventor: Roger D. Thornton, R.R. 6, Box 179AB, Wapakoneta, Ohio 45895

[21] Appl. No.: 720,556
[22] Filed: Jun. 25, 1991
[51] Int. Cl.[5] .............................................. G05F 1/46
[52] U.S. Cl. .................................. 323/322; 323/283; 323/350
[58] Field of Search ............... 323/282, 283, 318, 322, 323/349, 350, 351, 902, 905

[56] References Cited

U.S. PATENT DOCUMENTS

| | | | |
|---|---|---|---|
| 4,087,796 | 5/1978 | Brown | 340/187 |
| 4,222,048 | 9/1980 | Johnson | 340/747 |
| 4,521,764 | 6/1985 | Burton | 323/283 |
| 4,626,769 | 12/1986 | Valley et al. | 323/283 |
| 4,761,725 | 8/1988 | Henze | 323/283 |
| 4,825,143 | 4/1989 | Cheng | 323/351 |
| 4,871,961 | 10/1989 | Kersten et al. | 323/351 |

Primary Examiner—Steven L. Stephan
Assistant Examiner—B. Davidson
Attorney, Agent, or Firm—Michael S. Yatsko

[57] ABSTRACT

A flexible reference voltage circuit includes a circuit for producing a first digital signal representative of a range of reference voltage levels; a circuit for producing a second digital signal representative of a selected reference voltage level within the range of reference voltage levels; an adder for adding the first and second digital signals to produce a third digital signal; and a digital to analog converter for providing an output voltage in response to the third digital signal. The method of producing a flexible reference voltage performed by the circuit is also claimed. The invention can be used with a differential protection circuit to provide a series of trip level ranges, with a series of selectable trip levels in each range. This is accomplished in a high accuracy circuit which is relatively simple to construct, thereby minimizing size and complexity of the current sensor module, in differential protection applications, or the circuitry, if used in a power system controller. Standard digital logic components can be used to perform the necessary range/level decoding.

9 Claims, 1 Drawing Sheet

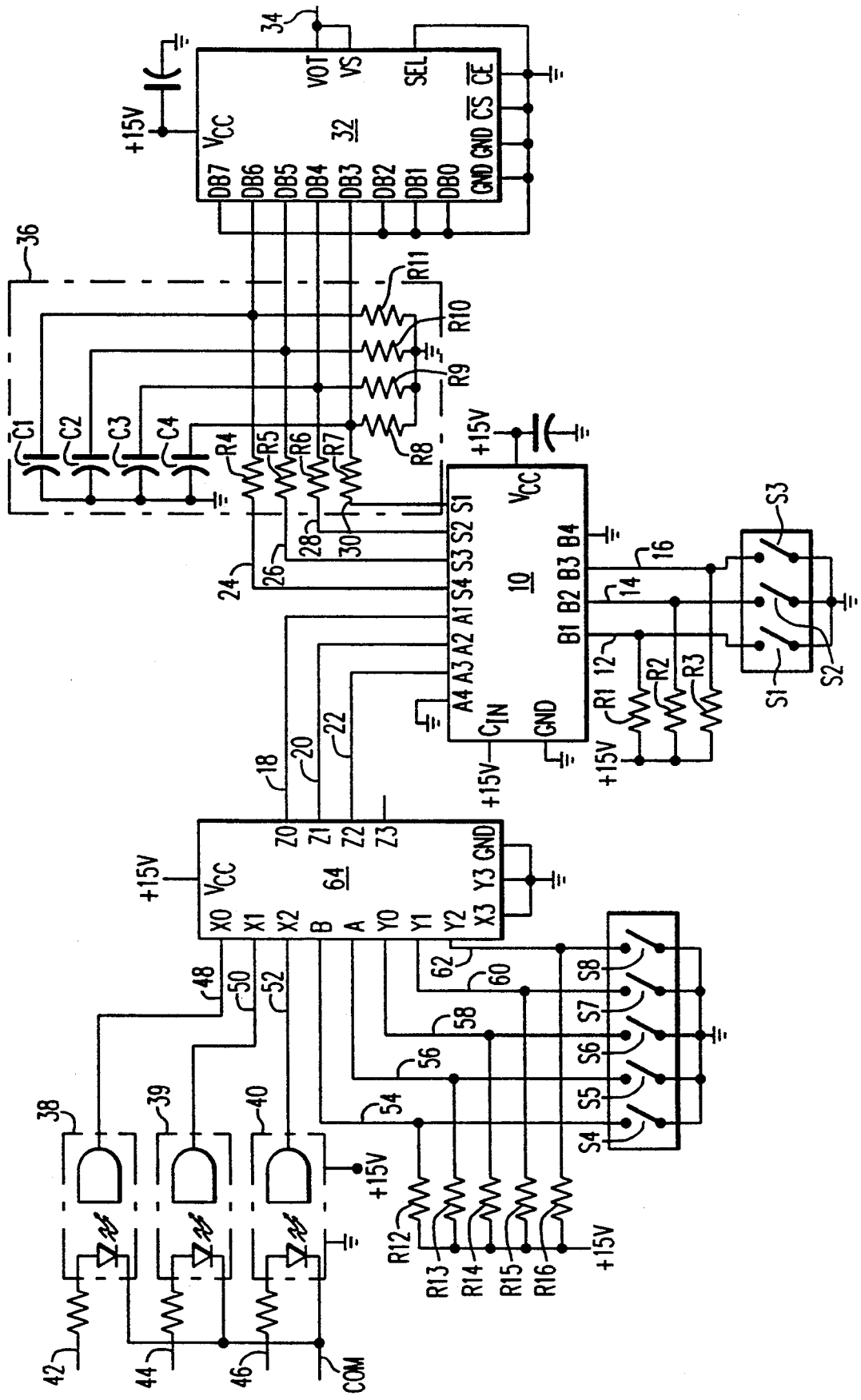

CIRCUIT AND METHOD FOR PRODUCING A FLEXIBLE REFERENCE VOLTAGE

STATEMENT OF GOVERNMENT INTEREST

The invention described herein was made in the performance of work under a subcontract based on NASA Prime Contract No. NAS-3-25078 and is subject to the provisions of Section 305 of the National Aeronautics and Space Act of 1958, as amended (42 U.S.C. 2457).

BACKGROUND OF THE INVENTION

This invention relates to electronic circuits and, more particularly, to such circuits which provide a selectable output voltage.

In differential fault protection circuits of DC power systems, a reference voltage is required to define differential protection trip current levels. When developing laboratory versions of differential protection circuits, for safety reasons it is preferable to use the lowest possible differential protection trip levels, while a desire to avoid nuisance differential protection tripping in the power distribution system requires higher limits to avoid tripping due to noise and normal transients. Trip level adjustments may be made manually during initial system checks and via external programming performed under computer control.

Because of system complexity, a series of trip level ranges is required in addition to a series of selectable trip levels to cover a wide variety of system characteristics and fault current magnitudes. It is therefore desirable to provide some method of easily adjusting the differential protection trip levels in DC differential protection modules.

SUMMARY OF THE INVENTION

Flexible reference voltage circuits constructed in accordance with this invention include means for producing a first digital signal representative of a range of reference voltage levels; means for producing a second digital signal representative of a selected reference voltage level within said range of reference voltage levels; an adder for adding the first and second digital signals to produce a third digital signal; and a digital to analog converter for providing an output voltage in response to the third digital signal. In the preferred embodiment, the means for producing the second digital signal may include a data selector circuit connected such that the second digital signal may be selected from: a fourth digital signal, a fifth digital signal, a predetermined digital signal, or an exclusive NOR combination of the fourth and fifth digital signals.

The circuits of this invention provide a series of trip level ranges, with a series of selectable trip levels in each range. This is accomplished in a high accuracy circuit which is relatively simple to construct, thereby minimizing size and complexity of the current sensor module, in differential protection applications, or the circuitry, if used in a power system controller. Standard digital logic components can be used to perform the necessary range/level decoding. This invention encompasses both the above described circuits, and the method of producing a flexible reference voltage performed by those circuits.

BRIEF DESCRIPTION OF THE DRAWING

The invention will be more readily apparent to those skilled in the art by reference to the accompanying drawing, wherein the sole Figure is a schematic diagram of the flexible reference circuit constructed in accordance with the preferred embodiment thereof.

DESCRIPTION OF THE PREFERRED EMBODIMENT

The single FIGURE is a schematic diagram of the flexible reference circuit constructed in accordance with the preferred embodiment of the invention. Switches S1, S2 and S3 are used in combination with resistors R1, R2 and R3 to produce a first (or range) digital signal which serves as a first input signal to a 4-bit binary adder 10, on lines 12, 14 and 16. A second (or level) digital data signal on lines 18, 20 and 22 serves as a second input signal to the binary adder 10. Adder combines the first and second digital data signals to produce a third digital data signal on lines 24, 26, 28 and 30. The third digital data signal is delivered to a digital-to-analog converter 32 which produces a selectable reference voltage level on its output 34 in response to the third digital data signal. Resistors R4, R5, R6, R7, R8, R9, R10 and R11 and capacitors C1, C2, C3 and C4 form a filter network 36.

Optical isolators 38, 39 and 40 receive a command signal on lines 42, 44 and 46, which may be connected to a data bus, and produce a fourth digital signal on lines 48, 50 and 52. A pair of manual switches S4 and S5 are used in combination with resistors R12 and R13 to produce a pair of binary control signals on lines 54 and 56. Manual switches S6, S7 and S8 are used in combination with resistors R14, R15 and R16 to produce a fifth digital signal on lines 58, 60 and 62. A data selector 64 receives the fourth and fifth digital data signals and produces the second digital data signal on lines 18, 20 and 22.

The circuit shown in the FIGURE uses standard logic components to perform the necessary range/level decoding and uses a low cost analog-to-digital converter to produce the required voltage reference signal. The digital range/level encoder (circuits 10, 64 and associated components) requires no precision resistors or analog voltage sensing to interpret the desired range and level. The digital-to-analog converter is the only component with any significant temperature sensitivity and that can be controlled by part selection or standard compensation techniques. The reference voltage is generated in discrete steps and the offset between adjacent ranges is equal to one level step.

The digital-to-analog converter 32 is connected for a continuous output proportional to the binary signal on its inputs (DB0–DB7). It provides, in discrete steps, the analog reference output based on the binary code at its input. Each voltage output represents a specific range/level combination. The separation between these discrete voltage steps is determined by how many of the lower bits (DB0–DB3 of circuit 32) are grounded. For the digital-to-analog converter used in the preferred embodiment, each count represents approximately 39 mV allowing a separation of from 39 to 585 mV depending on how many and which inputs of the digital-to-analog converter are used for converting the range/level data. A discrete separation of 312 mV between the different reference voltage outputs has been demonstrated.

The input of the digital-to-analog converter is a four bit digital signal (nibble) filtered and scaled by circuit 36 to produce a 5 volt signal required by the digital-toanalog converter in the preferred embodiment. The capacitive filtering prevents any signal bounce or noise generated by the changing input signals from reaching the digital-to-analog converter output.

The four bit nibble is generated by adder 10, which performs two functions. First, it performs a binary add of the incoming level code and selected range value from switches S1, S2 and S3. Second, it allows an initial offset to be added to the sum of the range and level codes. The $C_{IN}$ input adder 10 is a "Carry In" signal and adds a binary one to the adder's output if it is tied to its active logic level. This feature allows the reference output to be one discrete step above zero volts for a range and level code of zero. Disabling the "Carry In" input allows a zero setting on both the range and level inputs to produce a zero reference voltage at the output.

Because of a desire to provide both a remotely programmable level select and an internal, manual adjustment of the reference level, a four bit, two channel data selector 64 was used to select the source of the level information. This device contains several operating modes which prove useful in the flexible voltage reference circuit. When the A and B inputs of circuit 64 are both low, the output to the binary adder is forced to zero thereby ordering the lowest reference level regardless of the input values. If A is high and B is low, then the "X" inputs are gated to the adder to allow an external source to set the reference level. Alternatively, if A is low and B is high, then the "Y" inputs and a second, different source can set the reference voltage level. Lastly, if both A and B are high, then an exclusive NOR logic operation is performed between the "X" and "Y" inputs. If one of the inputs, either "X" or "Y", is set to zero, then the value sent to the adder circuit will be the complement of the value on the other input. This can be used to change a normal power-on-default from, for example, a minimum reference level to a maximum reference voltage level with two control bits.

This invention also encompasses a method of producing a flexible reference voltage, comprising the steps of: producing a first digital signal representative of a range of reference voltage levels; producing a second digital signal representative of a selected reference voltage level within said range of reference voltage levels; adding the first digital and second digital signals to produce a third digital signal; and converting the third digital signal to an analog output voltage.

The invention provides a circuit which provides a precise reference voltage which can be controlled externally from one or two sources and in several modes of operation. The circuit uses standard logic and analog components to provide an analog reference voltage variable in discrete steps. The preferred embodiment circuit has a low component count and provides a precise reference voltage independent of temperature and passive component tolerances. It allows for separate control of output voltage level and the range of levels. A large number of discrete analog steps are controlled by digital signals compatible with manual switches, connector jumpers, or microcontrollers. Digital logic is easily reduced through current integration techniques.

Although the present invention has been described in terms of its preferred embodiment. It will be apparent to those skilled in the art that various changes may be made without departing from the scope of the invention. For example, the opto-couplers 38 and 40 are just one example of a data source as are the manual switches S1-S8. These devices can easily be replaced by compatible logic circuits, a microcontroller, or jumpers hard wired into an external connector. It is therefore intended that the appended claims cover such changes.

I claim:

1. A flexible reference voltage circuit comprising:
   means for producing a first digital signal having a plurality of binary bits corresponding to a binary number value, said binary number value of said first digital signal being representative of a range of reference voltage levels;
   means for producing a second digital signal having a plurality of binary bits corresponding to a binary number value, said binary number value of said second digital signal being representative of a selected reference voltage level within said range of reference voltage levels;
   an added for adding said first and second digital signals to produce a third digital signal, said third digital signal having a plurality of digital bits corresponding to a binary number value, said binary number value being the sum of the binary number values of said first and second digital signals; and
   a digital to analog converter for providing an output voltage corresponding to said third digital signal.

2. A flexible reference voltage circuit, as recited in claim 1, further comprising:
   means for filtering said third digital signal.

3. A flexible reference voltage circuit, as recited in claim 1, wherein said means for producing a second digital signal representative of a selected reference voltage level within said range of reference voltage levels comprises:
   a data selector circuit having a first input for receiving a fourth digital signal, a second input for receiving a fifth digital signal, first and second control inputs, and an output for producing said second digital signal in response to said fourth and fifth digital signals.

4. A flexible reference voltage circuit, as recited in claim 3, wherein
   said second digital signal is equal to one of; said fourth digital signal, said fifth digital signal, a predetermined digital signal, or an exclusive NOR combination of said fourth and fifth digital signals.

5. A flexible reference voltage circuit, as recited in claim 1, wherein
   said third signal is determined by adding a binary one to the sum of said first and second digital signals.

6. A method of producing a flexible reference voltage, said method comprising the steps of:
   producing a first digital signal having a plurality of binary bits corresponding to a binary number value, said binary number value of said first digital signal being representative of a range of reference voltage levels;
   producing a second digital signal having a plurality of binary bits corresponding to a binary number value, said binary number value of said second digital signal being representative of a selected reference voltage level within said range of reference voltage levels;
   adding said first and second digital signals to produce a third digital signal, said third digital signal having a plurality of digital bits corresponding to a binary number value, said binary number value being the sum of the binary number values of said first and second digital signals; and converting said third digital signal to an analog output voltage corresponding to said third digital signal.

7. A method of producing a flexible reference voltage, as recited in claim 6, further comprising the step of: filtering said third digital signal.

8. A method of producing a flexible reference voltage, as recited in claim 6, wherein:
said second digital signal is equal to one of; a fourth digital signal, a fifth digital signal, a predetermined digital signal, or an exclusive NOR combination of said fourth and fifth digital signals.

9. A method of producing a flexible reference voltage, as recited in claim 6, wherein
said third signal is determined by adding a binary one to the sum of said first and second digital signals.

* * * * *